United States Patent [19]

Harwood

[11] 4,344,209
[45] Aug. 17, 1982

[54] IN-LINE CLIPPER SEAM

[75] Inventor: William J. Harwood, Waycross, Ga.

[73] Assignee: Scapa Dryers, Inc., Waycross, Ga.

[21] Appl. No.: 86,792

[22] Filed: Oct. 22, 1979

[51] Int. Cl.³ .............................................. F16G 3/02
[52] U.S. Cl. ................................... 24/31 R; 24/33 R;
24/33 C; 139/383 A; 198/844
[58] Field of Search .................. 24/33 R, 33 A, 33 B,
24/33 C, 33 K, 33 P, 33 M, 33 F, 32, 31;
139/383 A; 198/844, 847, 848, 849

[56] References Cited

U.S. PATENT DOCUMENTS

| | | | |
|---|---|---|---|
| 771,279 | 10/1904 | Sirois | 24/33 B |
| 1,748,880 | 2/1930 | Hill | |
| 1,932,203 | 10/1933 | Diamond | 24/33 C |
| 1,986,490 | 1/1935 | Wilson | 24/33 R |
| 2,025,275 | 12/1935 | Diamond | 24/33 R |
| 2,084,490 | 6/1937 | Hooper | 24/33 R |
| 2,139,544 | 12/1938 | Fleming | 24/33 R |
| 2,228,926 | 1/1941 | Matthaei et al. | 24/33 C |
| 2,675,592 | 4/1954 | Lofton | 24/33 M |
| 2,873,494 | 2/1959 | Santos | 24/33 R |
| 2,879,580 | 3/1959 | Hindle | |
| 2,893,007 | 7/1959 | De Windt | 24/33 C |
| 2,934,097 | 4/1960 | Hindle et al. | 139/383 A |
| 2,949,134 | 8/1960 | Hindle et al. | 139/383 A |
| 3,225,900 | 12/1965 | MacBean et al. | |
| 3,281,905 | 11/1966 | Wagner | 24/33 C |
| 3,316,599 | 5/1967 | Wagner | 24/33 C |
| 3,461,511 | 8/1969 | Perina | 24/31 |
| 3,546,054 | 12/1970 | Ross | 198/844 |
| 3,664,907 | 5/1972 | Price | |
| 3,735,451 | 5/1973 | Haythornthwaite | 24/33 R |
| 4,103,717 | 8/1978 | Clark | 139/383 A |

FOREIGN PATENT DOCUMENTS 2508101  11/1975  Fed. Rep. of Germany ..... 24/33 R Primary Examiner—Victor N. Sakran
Attorney, Agent, or Firm—Fleit & Jacobson

[57] ABSTRACT

A clipper seam for use with a pintle or lacing unit to join adjacent ends of a papermakers belt or the like. The clipper seam comprises two seam webbings, each of which is woven as a one-piece unit to form a pocket for receiving one of the ends of the papermakers belt. As woven, the pocket is defined by first and second flaps, each of the flaps having an inner surface and an outer surface, the inner surfaces being in a spaced relationship to define the pocket, which is adapted to receive one of the ends of the papermakers belt. Each of the outer surfaces define a stepped, tapered construction. A tongue portion also forms part of the seam webbing. Recessed margins are provided on both the top and bottom surfaces of the tongue, near the distal end or selvage of the tongue. A plurality of clipper hooks adapted to receive one or more pintles are secured to the tongue within the recessed margin. The end of the papermakers belt is secured within the pocket through the use of stitching threads buried in the seam webbing.

13 Claims, 10 Drawing Figures

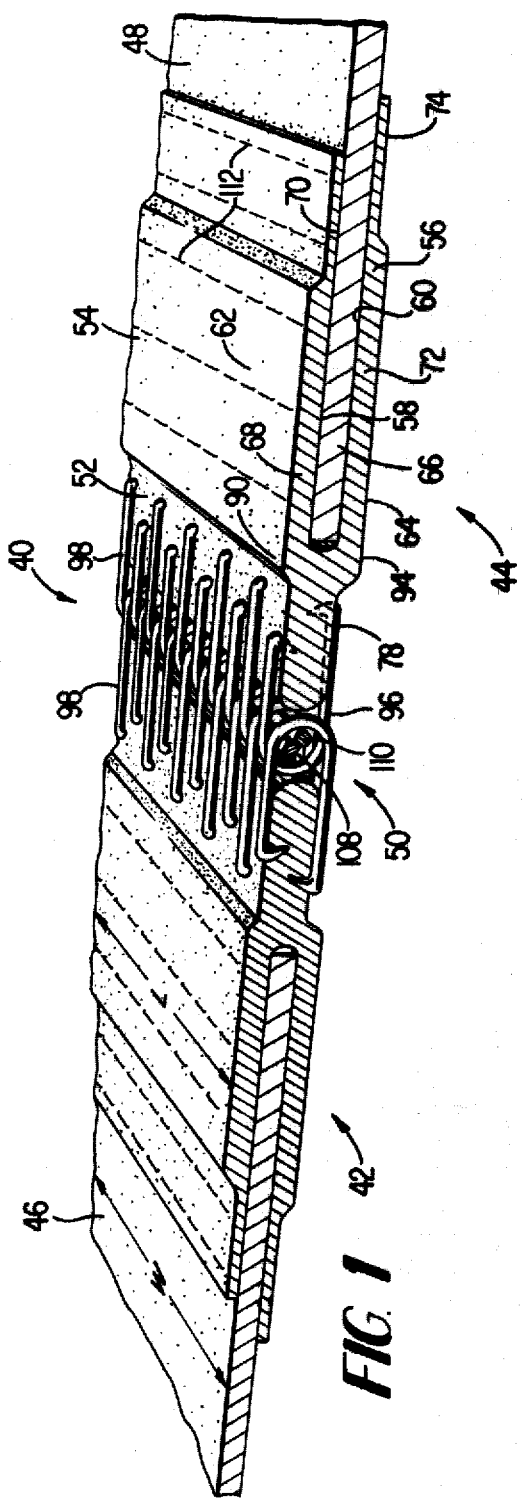
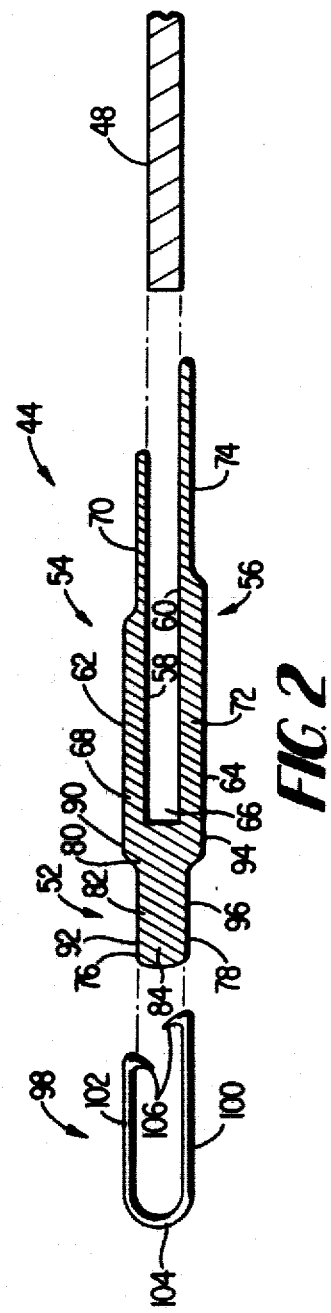
FIG. 1
FIG. 2

IN-LINE CLIPPER SEAM

BACKGROUND OF THE INVENTION

1. Field of the Invention

This invention relates to clipper seams for use in joining the ends of a papermakers belt or the like.

2. Description of the Prior Art

In papermaking machines, a papermakers belt in the form of an endless belt-like structure is supported on and advanced by various machine rolls during the papermaking process. Papermakers belts carry various names depending on their intended use. By way of example, papermakers belts include forming fabrics, wet press felts, and dryer felts and fabrics, to name just a few. In each case, the belt or fabric is joined at its ends to form an endless belt which is supported and controlled by various machine rolls associated with the papermaking machine.

The prior art employs various types of seams which are joined together through the use of a pintle in order to facilitate insertion and removal of the papermakers belt from the papermaking machine. A very common type of seam is one employing metal clipper hooks arranged in an alternating relationship on either end of a papermakers belt to receive a pintle to join the ends of the belt together. The clipper hooks may be inbedded directly into the ends of the belt, or may be secured to seam webbings which are in turn attached or secured to the ends of the belt through suitable stitching.

Other types of arrangements for joining the ends of a papermakers belt include those in which the metal hooks are replaced by pintle receiving loops that are made from a synthetic material and are usually integral with the yarns used to define either the ends of the papermakers belt or the seams attached to the belt.

Certain problems exist with each of the prior structures used to secure the ends of the various belts together. In some papermakers belts, the ends of the belt are joined in an abutting relationship and held that way through the use of clipper hooks inserted in a webbing, the whole of which is attached to the underside of the belt. Since the tension line of the seam is below that of the fabric, the seam tends to move upwards so that both tension lines become coplanar. This in turn causes the abutting ends of the papermakers belt to press up against the paper sheet. When the paper sheet lies between a machine roll and the felt seam, the pressure between roll and seam increases thereby causing seam marking in the sheet, especially in the case of fine or critical grades of paper. Another problem associated with this type of seam occurs when the seam either makes or leaves the contact of a machine roll. A bouncing of the papermakers belt occurs, which leads to further marking of the paper sheet, paper sheet breaks and a rapid weakening of the fabric structure in the seam area.

Thread unraveling is a problem which occurs in papermakers belts in which the cut ends of the belt are exposed to either, or both, the paper sheet being formed, or the machine rolls. The last several threads in the cross machine direction at the end of a papermakers belt have the potential to become loose, a condition which may lead to further marking of the paper sheet.

Typically, in the case of a clipper seam that is attached to a papermakers belt, the sewing threads used to secure the seam to the ends of the belt are proud due to the typically hard and unyielding belt surface. Since the sewing threads are exposed on the surface of the belt and the surface of the seam, the threads are prone to wear, which ultimately leads to seam failure. The proud sewing threads can also cause paper marking problems.

One problem associated with the type of clipper seam that employs clipper hooks imbedded into the ends of the belt is that the hooks are normally proud on both the paper side and machine-roll side of the belt. This may lead to sheet marking on the paper side and to wear problems on the machine-roll side. Another problem is that the last few threads of the seam must be sealed or else the hooks will not imbed properly.

There is thus a need for a clipper seam for joining the ends of a papermakers belt in which the chances of seam failure are substantially reduced, the problem of unraveling is eliminated, and the problem of paper marking is severely curtailed. The present invention is directed toward filling that need.

SUMMARY OF THE INVENTION

The present invention relates to a clipper seam for use with a pintle or lacing unit to join adjacent ends of a papermakers belt or the like. When used in describing the clipper seam, the terms "machine direction" and "cross-machine direction" are applied to the clipper seam in its position of intended use on a papermaking machine. Basically, the clipper seam comprises two seam webbings, each of which is woven as a one-piece unit from a plurality of machine direction and cross-machine direction yarns to form a pocket for receiving one of the ends of the papermakers belt. As woven, the pocket is defined by first and second flaps, each of the flaps having an inner surface and an outer surface, the inner surfaces being in a spaced relationship to define the pocket, which is adapted to receive one of the ends of the papermakers belt.

A tongue portion, which is integral with the flaps, also forms part of the seam webbing. The tongue portion defines a top surface which is coplanar, i.e., lying in the same plane, with a portion of the outer surface of the first flap, and a bottom surface which is coplanar with a portion of the outer surface of the second flap. Recessed margins are provided on both the top and bottom surfaces of the tongue, near the distal end or selvage of the tongue. In addition, each of the flaps contains a recessed margin along its distal end or selvage.

A plurality of clipper hooks adapted to receive one or more pintles are secured to the tongue within the recessed margin.

The end of the papermakers belt is secured within the pocket through the use of stitching threads buried in the flaps, a predetermined distance from the outer surfaces of the flaps.

The first flap, which is associated with the top surface of the tongue, has a distal end that is closer to the tongue than the distal end of the second flap, which is associated with the bottom surface of the tongue. The widths of each recessed margin associated with the flaps, as measured from the distal end of each flap in a direction toward the tongue, are approximately equal. In this way, two inclined areas are defined on the outer surfaces of each flap. These areas are in a staggered relationship in much the same way as the distal ends of the flaps.

When each of the seam webbings with their associated clipper hooks are secured to an end of the papermakers belt, and the clips are, in turn, held together by one or more pintles, the resultant clipper seam may be referred to as being "in-line", in that the ends of the papermakers belt and the clipper hooks lie substantially in the same plane, thus eliminating the problem of seam pressure marking of a paper sheet sandwiched between the seam and machine roll around which the belt is travelling. Likewise, the pocket, formed by the two flaps, completely protects the ends of the belt from unraveling and thus eliminates the paper marking problem associated with this non-desirable event. Finally, the stitching threads used to secure the belt within the pocket are buried into the flaps of the seam webbing and are thus not proud on the surface, thereby eliminating the paper marking and webbing attachment failure problems. Also, the staggered, stepped relationship of the outer surfaces of the flaps, substantially eliminates the problem of bouncing, occurring when the clipper seam makes contact with, or leaves the machine rolls. This in turn reduces the likelihood of paper sheet breaks and weakening of the belt structure in the seam area.

It is thus an object of the present invention to provide an improved seam which substantially reduces the problem of paper marking.

It is another object of the present invention to provide a clipper seam in which the problem of seam failure is substantially reduced.

It is a further object of the present invention to provide a clipper seam in which the life of the yarn stitching used to secure the seam to the papermakers belt is appreciably increased.

It is still an object of the present invention to provide a clipper seam including two seam webbings each of which is woven in a one-piece construction.

It is yet an object of the present invention to provide a clipper seam which prevents the unraveling of the ends of the papermakers belt.

It is yet a further object of the present invention to provide a clipper seam comprising two seam webbings each woven in a one-piece construction, each defining a pocket for receiving an end of the papermakers belt, and each having a number of metal clipper hooks secured thereto for subsequent joining through the use of one or more pintles.

Additional objects of the present invention become apparent from a reading of the appended specification and claims in which preferred but not necessarily the only forms of the invention will be described in detail, taken in connection with the drawings accompanying and forming a part of the application.

BRIEF DESCRIPTION OF THE DRAWINGS

FIG. 1 is a perspective view showing a portion of an assembled and attached clipper seam embodying the teachings of the subject invention.

FIG. 2 is a cross-sectional view showing the elements of one side of the seam of FIG. 1.

DETAILED DESCRIPTION OF THE DRAWINGS

Figure 3:
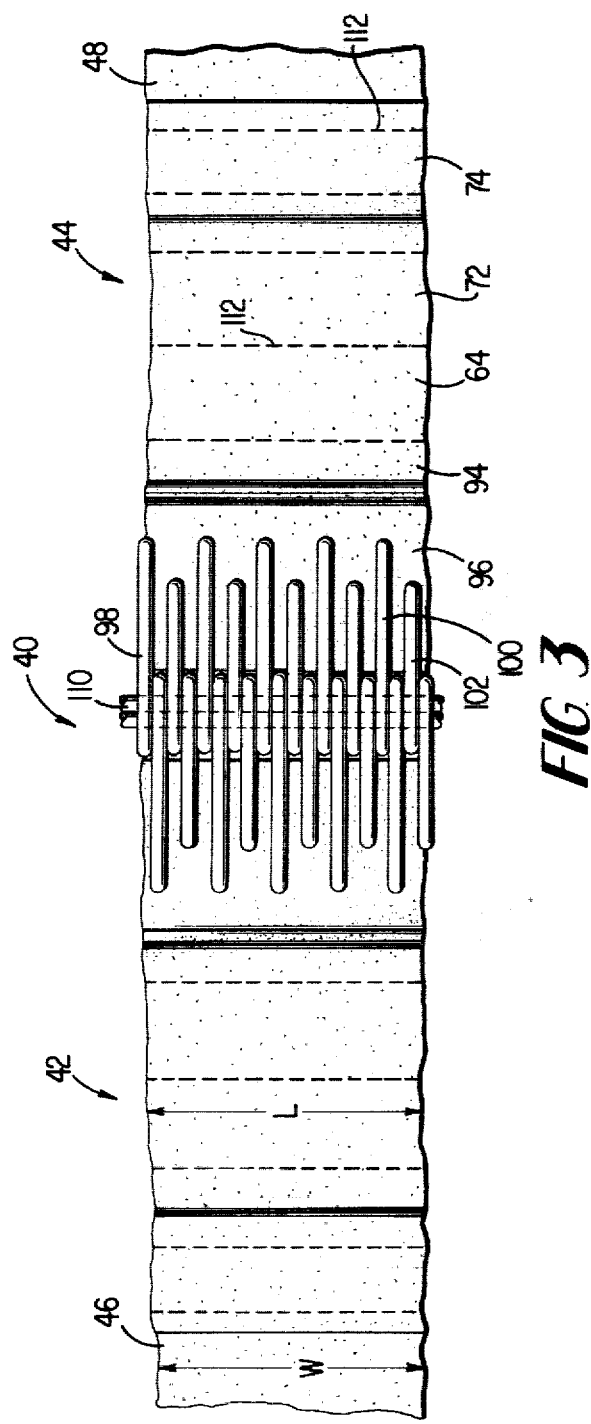
FIG. 3 is a bottom plan of a portion of the assembly shown in FIG. 1.
Figure 4:
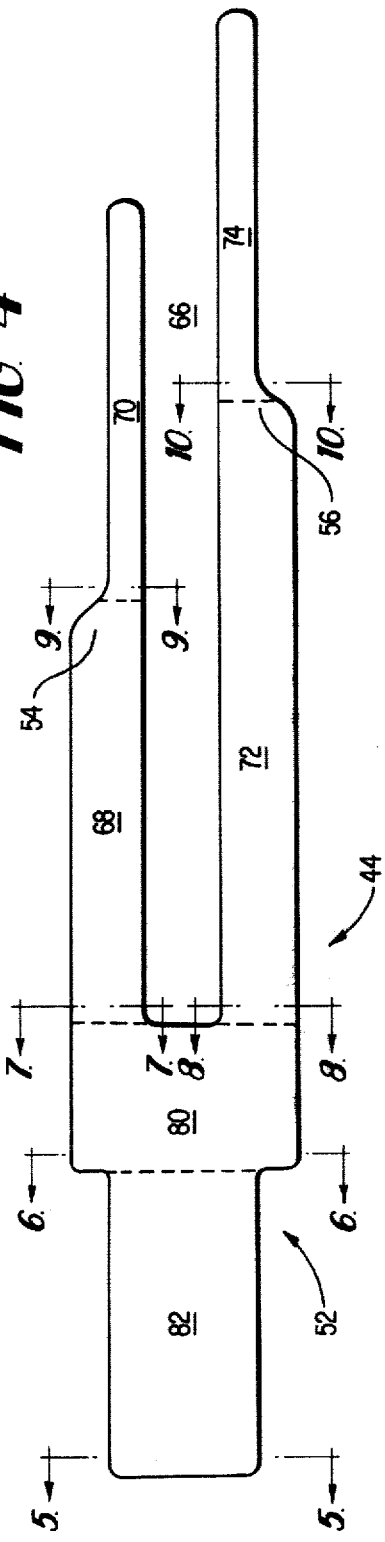
FIG. 4 is a schematic diagram in cross-section showing the various weave sections for the seam webbing of FIG. 2.

With reference to FIGS. 1-3, there is shown an embodiment of a clipper seam incorporating the teachings of the subject invention. The clipper seam, generally designated as 40, comprises a pair of seam webbings 42 and 44 each of which receives one end 46 and 48 of a papermakers belt, and each of which is joined together by a pintle-receiving clipper hook assembly 50 to form a flexible clipper seam. Please note that FIG. 1 illustrates only a portion of the width W of the papermakers belt and the length L of the clipper seam 40 with the realization that the structure shown in FIG. 1 continues throughout the full width of the papermakers belt.

Each of the seam webbings 42 and 44 are identical and are separately woven in a one-piece construction from a plurality of machine direction and cross-machine direction yarns. A detailed discussion of a suitable weave for producing the seam webbings will be presented hereinafter. At this point, however, a discussion of the details of the seam webbings will be presented using seam webbing 44 as an example with the realization that the same applies to seam webbing 42.

In its orientation in FIG. 1, seam webbing 44 contains a tongue portion 52 and a pair of flaps 54 and 56 integral therewith. Each flap defines an inner surface 58 and 60 and an outer surface 62 and 64. The flaps 54 and 56 are spaced apart so that their inner surfaces 58 and 60 define a pocket 66 for receiving the end 48 of a papermakers belt. Flap 54 consists of two longitudinally extending zones 68 and 70, the first zone 68 being integral with the tongue and the second zone 70 forming a selvage or recessed margin on the flap 54. In a preferred embodiment, zone 68 is of a two-ply woven construction and zone 70 is of a one-ply woven construction.

In like manner, flap 56 contains two longitudinally extending zones 72 and 74, zone 72 being integral with the tongue 52, and zone 74 defining a selvage or recessed margin for the flap 56. Also, zone 72 is of a two-ply woven construction and zone 74 is of a one-ply woven construction in the preferred embodiment.

With reference to FIG. 2, tongue 52 defines a top surface 76 and a bottom surface 78. Two longitudinally extending zones 80 and 82 constitute the tongue 52. Zone 82, in the preferred embodiment, is of a five-ply woven construction and defines a selvage 84 for the tongue. Zone 80, which is adjacent to the flaps 54 and 56, is also of a five-ply woven construction but contains additional machine direction yarns to make zone 80 thicker than zone 82. The top surface 76 in the area of zone 80 is substantially coplanar with the outer surface 62 of zone 68 associated with flap 54. Likewise, the bottom surface 78 of zone 80 is substantially coplanar with the outer surface 64 of zone 72 associated with the flap 56.

The top surface 76 of tongue 52, because of the way in which the tongue is woven, is actually divided into two portions as defined by the zones 80 and 82. Because zone 80 contains additional machine direction yarns to give that zone a greater thickness than zone 82, top surface 76 has a stepped-down configuration in the direction of the selvage end 84 of the tongue. Thus, top surface 76 comprises two surface portions 90 and 92 in a stepped relationship as defined by zones 80 and 82, respectively. In much the same way, zones 80 and 82 define bottom surface portions 94 and 96 in a similar stepped relationship.

As stated above, zone 82 defines the tongue selvage 84 which receives a plurality of clipper hooks 98, which are typically made of metal. Each hook 98 comprises a long limb 100 and a short limb 102 joined at one end by an integral loop 104. Each limb is provided at its opposite end with a prong 106, the latter being set into opposite surfaces 92 and 96 of the selvage 84 and clenched.

As best seen in FIGS. 1 and 3, and using seam webbing 44 as an example, the hooks 98 are distributed along the surfaces 92 and 96 of the selvage 84 in an alternating arrangement of long and short limbs, each hook being spaced from its adjacent hook by a distance approximately equal to the thickness of one of the limbs. As shown in FIG. 1, the hooks secured to the selvages of each one of the seam webbings 42 and 44 are intermeshed to collectively provide a transverse passage 108 through which one or more lacing wires or pintles 110 may be inserted to connect the adjacent ends of the papermakers belt in the form of a hinge.

In order to provide a smooth surface and to facilitate holding of the hooks 98 in place, the surfaces 92 and 96 of the selvage 84 in each one of the seam webbings 42 and 44 are treated with a suitable resin, such as acrylic resin, after insertion of the hooks 98 into the tongue 52. The resin treatment causes swelling and hardening of the selvage 84 to assist in holding the hooks 98.

The machine direction and cross machine direction yarns used to produce the seam webbing preferably have characteristics which produce a soft and flexible fabric as well as having high resistance to paper machine conditions. A yarn which has proven to be of particular advantage is one made from Nomex. The end 48 of the papermakers belt is secured within the pocket 66 of the seam webbing 44 by yarn stitching or sewing threads 112, which pass through the flaps 54 and 56, and the papermakers belt 48. Because the seam webbing 44 is soft and flexible, the sewing threads 112 are able to be drawn into the webbing seam so that they are recessed below the outer surfaces of flaps 54 and 56. In this way, the stitches 112 are buried within the surfaces of the flaps.

As viewed in cross section in FIG. 2, the width of zone 68 is less than that of zone 72, while the width of zone or recessed margin 70 is substantially equal to the width of zone or recessed margin 74. This staggered relationship between the stepped construction on the outer surface of the flaps 54 and 56 ensures that top and bottom shock do not occur at the same point as the seam leaves a machine roll.

Figure 6:
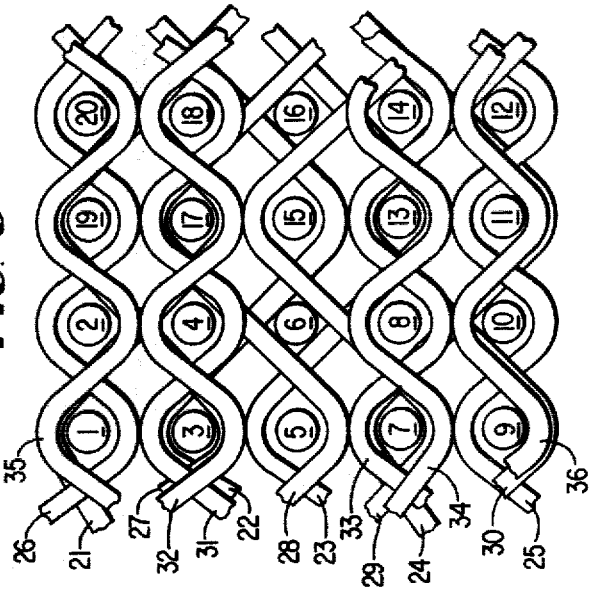
FIG. 6 is a diagram of the weave structure for the seam webbing as viewed along lines 6—6 of FIG. 4.
Figure 5:
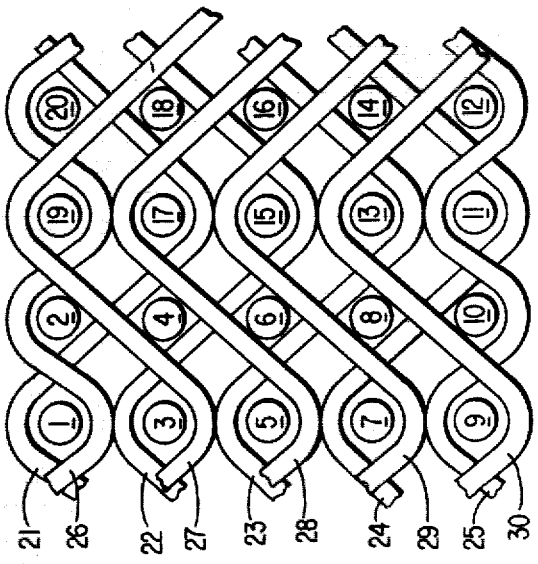
FIG. 5 is a diagram of the weave structure for the seam webbing as viewed along lines 5—5 of FIG. 4.
Figure 7:
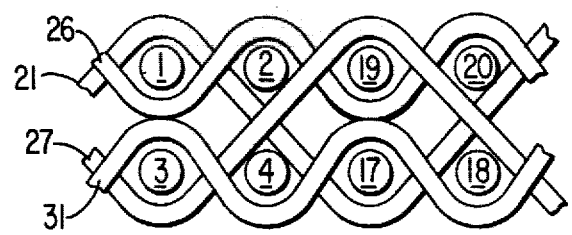
FIG. 7 is a diagram of the weave structure for the seam webbing as viewed along lines 7—7 of FIG. 4.
Figure 8:
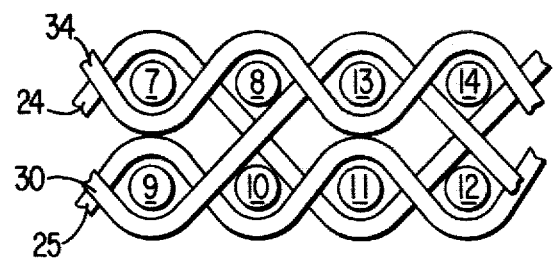
FIG. 8 is a diagram of the weave structure for the seam webbing as viewed along lines 8—8 of FIG. 4.
Figure 9:
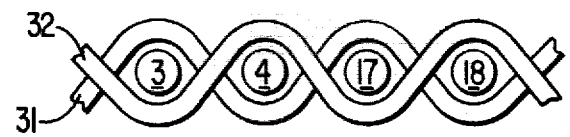
FIG. 9 is a diagram of the weave structure for the seam webbing as viewed along lines 9—9 of FIG. 4.
Figure 10:
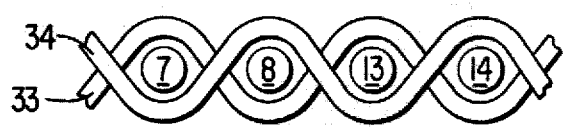
FIG. 10 is a diagram of the weave structure for the seam webbing as viewed along lines 10—10 of FIG. 4.

With reference to FIGS. 4 through 10, there is shown one weave structure for a seam webbing made in accordance with the teachings of the present invention. Please note that like reference numerals denote like elements previously described. The seam webbing is produced in a one-piece construction by weaving a plurality of cross-machine direction yarns 21 through 30 with a plurality of machine direction yarns 1 through 20 in accordance with the weave patterns suggested by the diagram in FIG. 4. Additional cross-machine direction yarns 31 through 36 are incorporated into the pattern to add the extra thickness to zone 80 of the tongue 52 as shown in FIG. 6.

In the embodiment shown in FIGS. 4 through 10, the cross-machine direction yarns 21–36 are made up of discrete warp yarns, having a denier of approximately 2000, whereas the machine yarns 1–20 are made up of a continuous weft yarn, which has a denier of approximately 4500, and which goes back and forth through the fabric during the picking operations. By way of example machine direction yarn 1, after completion of the first picking step, turns upon itself and becomes machine direction yarn 2. At the other end of the fabric, machine direction 2 turns upon itself and becomes machine direction yarn 3. This pattern is repeated for the remaining machine direction yarns.

The seam webbing 44 is woven in a one-piece construction on a suitable 20-harness webbing or ribbon loom (such as a Matterson loom), which is set up with a sufficient number of warp yarns 21 through 30 (FIG. 5) so that the resultant width of zone 82 is approximately one-half inch. A sufficient number of warp yarns 21 through 30 and additional warn yarns 31 through 36 (FIG. 6) are set up on the loom so that the width of zone 80 is approximately one-quarter of an inch. A sufficient number of warp yarns 21, 26, 27 and 31 (FIG. 7) are employed so that the width of zone 68 is approximately one-half inch. In like manner, a sufficient number of warp yarns 24, 25, 30 and 34 (FIG. 8) are used so that zone 72 has a width of approximately three-quarters of an inch. A sufficient number of warp yarns 31 and 32 (FIG. 9) are employed so that zone 70 has a width of approximately one and one-quarter inches, while a sufficient number of warp yarns 33 and 34 (FIG. 10) are employed so that zone 74 has a width of approximately one and one-quarter inches.

The weaving arrangement illustrated in FIGS. 4–10 is repeated a sufficient number of times to generate a seam webbing having a desired length. In the alternative, the pattern in FIG. 4 may be repeated as often as desired to produce a webbing seam of indeterminant length. The webbing seam is then taken up on a roll for subsequent cutting to a desired length. The cut warp ends are treated with a suitable adhesive such as "Pliobond" manufactured by Goodyear Tire & Rubber Co. to provide a secure structure.

Although the present invention has been shown and described in terms of a specific preferred embodiment, it will be appreciated by those skilled in the art that changes or modifications are possible which do not depart from the inventive concepts described and taught herein. For example, it is contemplated that the webbing seam may be woven in a manner other than that illustrated in FIG. 4. It is entirely possible to weave the webbing seam so that the machine direction yarns are represented by warp yarns and the cross-machine direction yarns are represented by weft yarns, in which case, the warp yarns will be defined by a continuous yarn rather than the discrete yarns used to define the weft yarns of the embodiment in FIG. 4. In addition, the specific dimensions of the webbing seam and the deniers of the warp and weft yarns are provided by way of example only, and it is contemplated that the dimensions of the webbing seam and the denier of the yarns may be changed without departing from the teachings of the present invention. The changes and modifications, just mentioned, are deemed to fall within the purview of the inventive concepts of the present invention.

What is claimed is:

1. A clipper seam for use with a pintle in joining adjacent ends of a papermakers belt or the like, said seam comprising:
   (A) a plurality of machine direction and cross-machine direction yarns interwoven to form a one-piece seam webbing including
      (a) first and second flaps, each of said flaps having an inner surface and an outer surface, wherein the outer surfaces of said flaps each taper in a stepped relationship in a direction away from said tongue to said one of said ends of said papermakers belt, said inner surfaces being in a spaced relationship to define a pocket adapted to receive one of said ends of said papermakers belt,
      (b) a tongue portion, said flaps being integral with said tongue portion in said spaced relationship, said tongue portion defining a top surface which is coplanar with a portion of the outer surface of said first flap and a bottom surface which is coplanar with a portion of the outer surface of said second flap,
      (c) a first recessed margin on the top surface of said tongue, and
      (d) a second recessed margin on the bottom surface of said tongue; and
   (B) a plurality of clipper hooks secured to said tongue within said first and second recessed margins, said hooks being adapted to receive a pintle.

2. The clipper seam of claim 1, further comprising means for securing said seam webbing to said one of said ends received in said pocket.

3. The clipper seam of claim 1, further comprising a coating of resin on said top and bottom surfaces of said tongue for causing said tongue to swell and harden to aid in securing said clipper hooks to said tongue.

4. The clipper seam of claim 1, wherein the tapered steps of said flaps are staggered with respect to each other.

5. The clipper seam of claim 2, wherein said securing means comprises stitching threads buried in said flaps for securing said one of said ends in said pocket.

6. A clipper seam for use in joining adjacent ends of a papermakers belt or the like, said seam comprising:
   (A) a plurality of machine direction and cross-machine direction yarns interwoven to form a one-piece seam webbing including
      (a) first and second flaps, each of said flaps having an inner surface and an outer surface, said inner surfaces being in a spaced relationship to define a pocket adapted to receive one of said ends of said papermakers belt, said outer surfaces of said flaps each tapering in a stepped relationship in a direction away from said tongue to said one of said ends of said papermakers belt,
      (b) a tongue portion, said flaps being integral with said tongue portion in said spaced relationship, said tongue portion defining a top surface which is coplanar with a portion of the outer surface of said first flap and a bottom surface which is coplanar with a portion of the outer surface of said second flap,
      (c) a first recessed margin on the top surface of said tongue, and
      (d) a second recessed margin on the bottom surface of said tongue.

7. The clipper seam of claim 6, further comprising means for securing said seam webbing to said one of said ends received in said pocket.

8. The clipper seam of claim 7, wherein said securing means comprises stitching threads buried in said flaps for securing said one of said ends in said pocket.

9. The clipper seam of claim 6, wherein the tapered steps of said flaps are staggered with respect to each other.

10. A clipper seam for use in joining adjacent ends of a papermakers belt or the like, said seam comprising:
   a plurality of machine direction and cross-machine direction yarns interwoven to form a one-piece seam webbing having first and second flaps and a tongue portion, each of said flaps having an inner surface and an outer surface, said inner surfaces being in a spaced relationship to define a pocket adapted to receive one of said ends of said papermakers belt, said flaps being integral with said tongue portion in said spaced relationship, said tongue portion defining a top surface which is coplanar with a portion of the outer surface of said first flap and a bottom surface which is coplanar with a portion of the outer surface of said second flap, each of said outer surfaces of said flaps each tapering in a stepped relationship from said tongue portion to said one of said ends, said tongue having a first recessed margin on said top surface and a second recessed margin on said bottom surface; and
   mean for securing said seam webbing to said one of said ends received in said pocket.

11. The clipper seam of claim 10, wherein said second flap terminates at a greater distance from said tongue portion than said first flap.

12. The clipper seam of claim 10, wherein the tapered steps of said flaps are staggered with respect to each other.

13. A clipper seam for use in joining adjacent ends of a papermakers belt or the like, said seam comprising:
   a plurality of machine direction and cross-machine direction yarns interwoven to form a one-piece seam webbing having first and second flaps, each of said flaps having an inner surface and an outer surface, said inner surfaces being in a spaced relationship to define a pocket adapted to receive one of said ends of said papermakers belt, and a tongue portion, said flaps being integral with said tongue portion in said spaced relationship, said outer surfaces of said flaps each tapering in a stepped relationship from said tongue to said one of said ends, the taper of said first flap staggered with respect to said second flap, said tongue having a first recessed margin on said top surface and a second recessed margin on said bottom surface; and
   stitching threads buried in said flaps a predetermined distance from the outer surfaces of said flaps and securing said one of said ends in said pocket.

* * * * *